United States Patent [19]

Driviere et al.

[11] Patent Number: 5,209,103

[45] Date of Patent: May 11, 1993

[54] APPARATUS FOR MONITORING THE QUALITY OF THE SURFACE STATE OF A PART

[75] Inventors: Jacques Driviere, Villeparisis; Jacques Bielle, Chalons sur Marne, both of France

[73] Assignee: Société d'Etudes et de Recherches de l'Ecole Nationale Supérieure d'Arts et Métiers (SERAM), Paris, France

[21] Appl. No.: 719,512

[22] Filed: Jun. 24, 1991

[30] Foreign Application Priority Data

Jun. 26, 1990 [FR] France .................. 90 08001

[51] Int. Cl.$^5$ ........................................... G01B 13/22
[52] U.S. Cl. ........................................... 73/37; 73/105
[58] Field of Search ..................... 73/37, 37.5, 105

[56] References Cited

U.S. PATENT DOCUMENTS

| | | | |
|---|---|---|---|
| 2,618,965 | 11/1952 | Gray ................................. | 73/105 X |
| 2,901,906 | 9/1959 | Emmons, III ..................... | 73/105 X |
| 3,379,050 | 4/1968 | Parker .............................. | 73/105 X |
| 3,517,545 | 6/1970 | Ogren .............................. | 73/37.5 |
| 3,747,395 | 7/1973 | Sherman .......................... | 73/37 X |
| 4,179,919 | 12/1979 | McKechnie ...................... | 73/37.5 |

FOREIGN PATENT DOCUMENTS

| | | | |
|---|---|---|---|
| 879466 | 6/1953 | Fed. Rep. of Germany . | |
| 1362970 | 4/1964 | France . | |
| 526771 | 10/1976 | U.S.S.R. ........................... | 73/105 |
| 1281881 | 1/1987 | U.S.S.R. ........................... | 73/105 |

Primary Examiner—Hezron E. Williams
Assistant Examiner—Joseph W. Roskos
Attorney, Agent, or Firm—Sixbey, Friedman, Leedom & Ferguson

[57] ABSTRACT

The apparatus comprises an air flow duct having an end portion fitted inside a nozzle whose front surface is trued so that it can be applied against the surface to be scanned and so that it can co-operate therewith to form a leak through which air flows as a function of the surface state of the part, and further comprises measuring means for measuring the flow rate of air passing through the leak. At its trued front surface, the nozzle delimits an annular air flow duct, and the portion of the nozzle inside the annular air flow duct includes a duct connected to the atmosphere.

10 Claims, 2 Drawing Sheets

FIG_1

APPARATUS FOR MONITORING THE QUALITY OF THE SURFACE STATE OF A PART

The present invention relates to apparatus for monitoring the regularity of the quality of the state of a determined surface throughout manufacture of a series of parts each having this surface.

BACKGROUND OF THE INVENTION

The state of a surface determines the quality of the thrust of a body thereagainst, in particular with respect to sealing effected between the surface and the body.

There is a discipline in metrology which deals specifically with surface states. This discipline may be referred to as "profilometry," and its purpose is to record, along a direction of the surface, the profile of its shape and of its irregularities referred to as "undulations" and "roughness", in compliance with French Standard No. E-05-015. Among the apparatuses (profilometers) used to effect these recordings, certain apparatuses have a contact tracer (a point which is more or less fine), and others use a ray of coherent light with the return signal therefrom being interpreted by interferometry.

The results of these recordings are stored in memories either graphically or in digital form and they constitute the closest possible image of the real profiles. By processing the step and the depths of the irregularities, the parameters are obtained concerning the profiles measured.

By calculation, and as a function of the recording methods, standardized parameter values are reached.

By taking a serie of recordings of profiles which are parallel and close together, a three-dimensional image of the scanned surface area is found.

Profilometry requires apparatuses which are not adapted to monitoring the quality of the surface state of parts in a production shop, in particular because these apparatuses are sensitive to mechanical and acoustic vibrations.

There are other apparatuses which produce data concerning the state of a surface. Mention should be made of capacitance measuring apparatuses in which the part constitutes one plate of a capacitor, and of workshop apparatuses which are essentially pneumatic and based on the principle of measuring the sonic flow of air through leaks, one of which takes place between the part and the measuring orifice of the apparatus.

Capacitance measuring apparatuses are limited to being used on surfaces that conduct electricity, and they are particularly sensitive to free metal particles which may lie on the surface if it is not cleaned correctly. Furthermore, they are not sensitive to undulation (misshapenness) and they are not suitable for use by a robot.

Pneumatic apparatuses are awkward to use because it is difficult to localize the sensor on the surface. They are slow to produce data because of the pressure-measuring systems they use. Finally, the surface quality of the walls of the nozzle influences pressure measurements.

There is currently a need to monitor regularity of production concerning surface state quality and to effect this monitoring on the production site itself.

An object of the invention is to meet this need by proposing an apparatus which is capable of comparing the geometrical characteristics of the roughness and the undulations of a plurality of surfaces and thus of assessing the quality of a surface state relative to a reference surface state, and which has members that are adapted to being handled automatically to ensure the apparatus is applied correctly against a part to be inspected and that do not require any prior adjustment of the measuring system.

SUMMARY OF THE INVENTION

To this end, the invention provides apparatus for monitoring the quality of the surface state of a part, said apparatus comprising an air flow duct having an end portion fitted inside a nozzle whose front surface is trued so that it can be applied against the surface to be scanned and so that it can co-operate therewith to form a leak through which air flows as a function of the surface state of the part, and further comprising measuring means for measuring the flow rate of air passing through the leak, in which the nozzle delimits an annular air flow duct at its trued front surface, the portion of the nozzle inside the annular air flow duct including a duct which collects the air leaking towards the center and which is connected to the atmosphere. It should be noted that, given the geometrical and dimensional dispositions of the apparatus, the leakage flow rate remains within the range of incompressible subsonic flows.

In a preferred embodiment, the apparatus comprises a substantially cylindrical outer supporting body for supporting the nozzle, with the nozzle being coupled to the body by flexible resilient means which exert an application force on the nozzle urging the nozzle towards the surface to be inspected when the body is applied thereagainst.

Advantageously, the flexible resilient means are constituted by at least one elastically deformable diaphragm coupled between the nozzle and the outside support to delimit a gas-tight chamber in the support, which chamber includes connection means for connection to a compressed gas supply, said connection means passing through the wall of the support.

Finally, it should be mentioned that the measuring means for measuring the leakage air flow rate are constituted by a hot-wire anemometer.

BRIEF DESCRIPTION OF THE DRAWINGS

An embodiment of the invention is described by way of example with reference to the accompanying drawings, in which.

DETAILED DESCRIPTION

Figure 1:
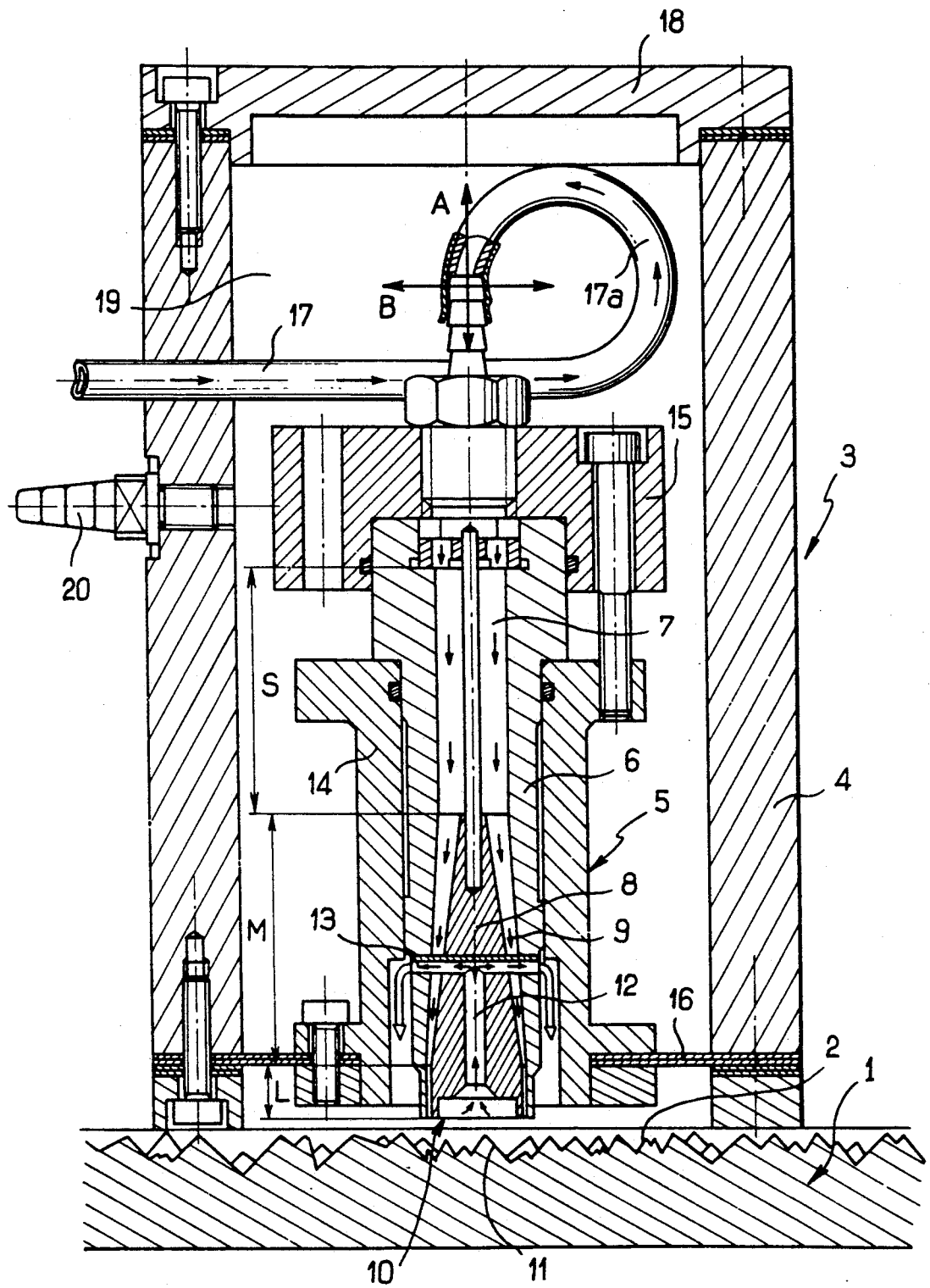
FIG. 1 is an axial section view through the end nozzle of an apparatus of the invention.

FIG. 1 shows a part 1 to be inspected having a rough horizontal surface 2. The sensor 3 of apparatus of the invention includes an outer casing 4 which is substantially cylindrical and which forms a support for a nozzle 5.

As shown, this nozzle 5 includes an inner cylindrical sleeve 6 which has a channel 7 whose cross-sectional area is constant in its top portion S, increases through its middle portion M, and is constant again in its bottom portion L.

Inside this channel, a core 8 occupies the center of the cross-sectional area in the regions M and L so as to delimit an annular duct 9, whose cross-sectional area varies in the region M as a function of a well-determined relationship and remains constant in the region L. The dimensions of the flow cross-sections in the channel S, and also the lengths of the regions M and L are determined by experiment to provide a flow of gas at the outlet of the annular channel in the end face 10 of the nozzle such that the flow is both free from turbulence and as uniform as possible.

The core 8 is itself provided with a bottom countersunk recess 11 into which a central duct 12 opens out, said central duct also opening out into a radial duct 13 passing through the middle region M of the duct 9.

The sleeve 6 is clamped by two outer parts 14 and 15, one of which parts serves to connect the nozzle to the casing 4 while the other part serves to connect the nozzle to a supply duct for supplying a gas (air) under pressure.

The nozzle is connected to the casing 4 via a ring-shaped deformable diaphragm 16 fixed by its outer periphery to the base of the casing 4 and by its inner periphery to the outer part 14. This diaphragm thus holds the nozzle resiliently inside the casing 4, while giving the nozzle a certain amount of freedom to move relative to the casing both in the axial direction and by tilting relative to this axial direction.

The supply duct 17 for supplying the gas under pressure to the channel 7 of the nozzle is made of a flexible material and is shaped into a loop 17a before being fixed into the part 15 so as to retain a maximum amount of freedom of movement for the nozzle 5 in the directions of arrows A and B.

The support 4 is closed at its top by a gas-tight cover 18, thereby delimiting a closed chamber 19 inside the casing 4, which chamber is suitable for being connected to a compressed air supply via an endpiece 20.

The sensor is operated by placing the body 4 on the surface 2. The chamber 19 is then inflated, thereby applying the front face 10 of the nozzle against said surface 2. This application is satisfactory since the nozzle rests on at least three high points of this surface, even if these three points define a plane which does not entirely coincide with the mean plane of the surface 2 (which substantially corresponds to the plane against which the casing 4 is applied, the diameter of said casing being large relative to the surface irregularities).

The air flowing along the duct 17 and then along the duct 9 escapes via the leaks that exist between the irregularities of the surface 2 under the front face 10 of the nozzle. The flow rate of this air is naturally a function of the geometrical characteristics of these irregularities. As described above, measuring this flow rate provides data which may be used in comparison with data of the same type obtained by scanning a reference surface or which may be used intrinsically in subsequent calculation to determine the orders of magnitude of certain parameters. It can be understood that such a device is extremely simple to manipulate and may therefore be coupled to the end of a robot arm.

Furthermore, due to the existence of the chamber 19 and the ducts 12 and 13 for evacuating the air from the center of the nozzle, the leakage flow rate is twice as great as it would have been if the leak had been directed radially outwards only, other things being equal. This disposition is advantageous because it enables the dimensions of a usable sensor (the outside diameter of the nozzle) to be reduced and therefore enables inspections to be performed on relatively small areas (e.g., in the automobile industry, the surfaces where the cylinder block and the cylinder head meet, which surfaces are generally narrow and are machined to be very smooth), while having an acceptable flow rate corresponding to a non-critical range of rates for measurement purposes. In this way, measurements are reliable and repeatable.

Moreover, this reduction in sensor size enables surfaces to be reached which were previously impossible to inspect, such as gasket seats situated at the bottoms of deep recesses, for example, and as is the case of plumbing fittings in particular.

Finally, the pneumatic device for pressing down the nozzle provides a constant application force from one measurement to another, thereby maintaining comparable measurement conditions from one part to another.

Figure 2:
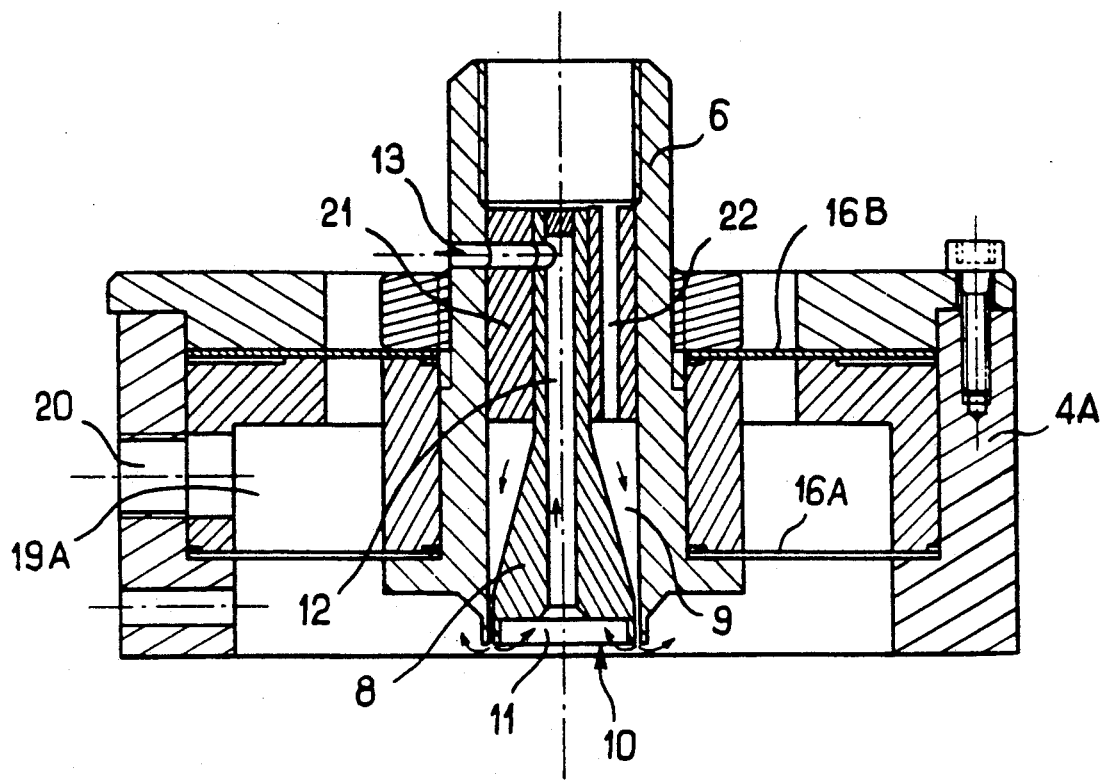
FIG. 2 is an axial section view through a variant embodiment of this nozzle.

The variant embodiment shown in FIG. 2 differs from the preceding embodiment by the fact that, in this case, the gas-tight chamber 19A is delimited in a very short support 4A by two diaphragms 16A and 16B which have different areas exposed to the inflation pressure. Thus, the compressed air arriving at 20 presses the nozzle downwards. The compressed air may be supplied to the nozzle via a very flexible hose which produces only a very small force on the nozzle. It should also be noted that there is a diffuser 21 in the duct 9 to regulate the flow of air as it approaches the nozzle outlet, said diffuser being constituted by a part having channels 22 which are uniformly distributed in the channel 9. This diffuser 21 serves to center the core 8 of the nozzle inside the surrounding sleeve 6 and it includes the exhaust ducts 13 connecting the chamber 11 to the atmosphere.

The shape of the annular air outlet slot of the nozzle may be circular, thereby enabling a surface to be scanned with there being no privileged direction. However, without going beyond the scope of the invention, the nozzle may have a rectangular opening, with greater leakage, for equal roughness, along the long sides than along the short sides. By taking two measurements on the same surface and changing the orientation of the nozzle between the two measurements, the differences between the leakage flow rates may be noted and, in this way, it is possible to deduce the orientation of the irregularities (e.g. resulting from the mode of action of the tool which made the surface under test).

Figure 3:
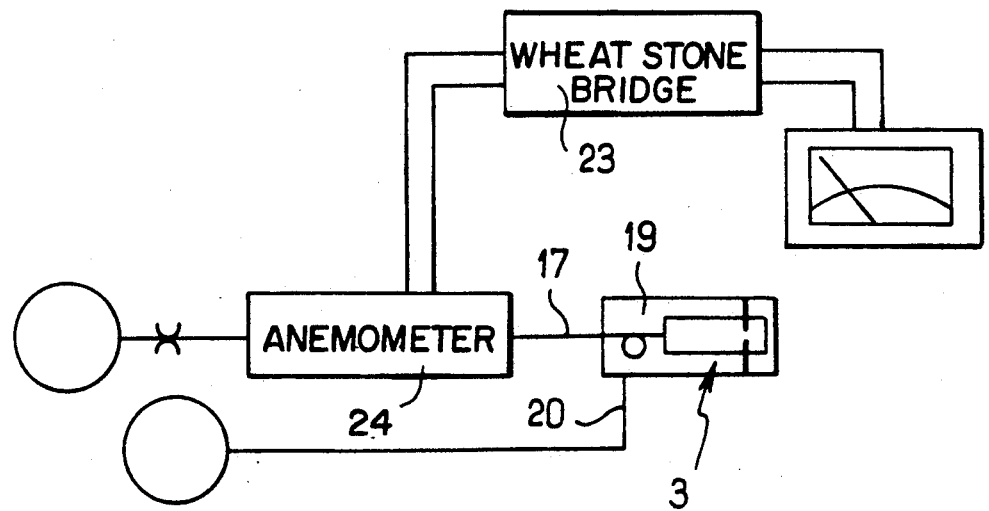
FIG. 3 is a block diagram of the apparatus as a whole.

FIG. 3 is a block diagram showing the entire apparatus of the invention. The leakage air flow rate is measured by a hot-wire anemometer 24, the principle of which is known per se. It is briefly recalled that a hot-wire anemometer includes a resistor wire placed in an air flow, with a current being applied to the wire. After a transient stage, the voltage drop remains constant if the air speed is constant. The law giving the relationship between air speed and the voltage is referred to as "King's law". Since the flow speed is linked to the flow rate, and thus to the leakage flow rate and therefore to the characteristics of the scanned surface, voltage variations enable the geometrical characteristics of the undulations and roughness to be assessed. FIG. 3 is thus a diagram of the apparatus which, in addition to the sensor 3, includes a hot-wire anemometer 24. Its resistor element is incorporated into a Wheatstone bridge 23 from which the value of the measurement is obtained.

It should be noted that since the front surface 10 of the nozzle is trued with great precision in apparatus of the invention, it may be suitable for inspecting gasket seats used for "super-fluids" such as hydrogen. The measuring gas would then be helium.

Finally, mention should be made of a variant embodiment (not shown) which consists in sucking the ambient air from the outside into the annular duct 9, the air which flows between the part and the trued face 10 of the nozzle coming both from the outside volume and from the inside volume of the nozzle.

This variant may be advantageous in measuring the surface state of a fragile, lightweight material such as expanded polystyrene since the suction creates a force that applies the part against the nozzle.

We claim:

1. Apparatus for monitoring the quality of the surface state of a part, said apparatus comprising an air flow duct having an end portion fitted inside a nozzle whose front surface is trued so that it can be applied against the surface to be scanned and so that it can co-operate therewith to form a leak through which air flows as a function of the surface state of the part, and further comprising measuring means for measuring the flow rate of air passing through the leak, wherein the nozzle delimits an annular air flow duct at its trued front surface, the portion of the nozzle inside the annular air flow duct including a duct connected to the atmosphere.

2. Apparatus according to claim 1, wherein the flow of air passing through the leak escapes from the nozzle.

3. Apparatus according to claim 1, wherein the flow of air enters the nozzle.

4. Apparatus according to claim 1, comprising a substantially cylindrical outer supporting body for supporting the nozzle, with the nozzle being coupled to the body by flexible resilient means which exert an application force on the nozzle urging the nozzle towards the surface to be inspected when the body is applied thereagainst.

5. Apparatus according to claim 1, wherein the annular cross section of the air outlet from the nozzle is circular.

6. Apparatus according to claim 1, wherein the nozzle is connected to the air flow duct by a flexible hose portion enabling the nozzle to move relative to the support in axial and in angular directions with little restriction.

7. Apparatus according to claim 1, wherein the measuring means for measuring the leakage air flow rate are constituted by a hot-wire anemometer.

8. Apparatus for monitoring the quality of the surface state of a part, said apparatus comprising an air flow duct having an end portion fitted inside a nozzle whose front surface is trued so that it can be applied against the surface to be scanned and so that it can cooperate therewith to form a leak through which air flows as a function of the surface state of the part, a substantially cylindrical outer supporting body for supporting the nozzle, with the nozzle being coupled to the body by flexible resilient means which exert an application force on the nozzle urging the nozzle towards the surface to be inspected when the body is applied thereagainst, said flexible resilient means constituted by at least one elastically deformable diaphragm coupled between the nozzle and the outer support to delimit a gas-tight chamber in the support, which chamber includes connection means for connection to a compressed gas supply with said connection means passing through the wall of the support and measuring means for measuring the flow rate of air passing through the leak;

wherein the nozzle delimits an annular air flow duct at its trued front surface, the portion of the nozzle inside the annular air flow duct including a duct connected to the atmosphere.

9. Apparatus according to claim 8, wherein the above-mentioned resilient means comprise two parallel diaphragms coupled between the support and the nozzle and delimiting between them the gas-tight chamber, the top diaphragm having a surface area exposed to the gas under pressure that is smaller than the surface area presented by the bottom diaphragm.

10. Apparatus for monitoring the quality of the surface state of a part, said apparatus comprising an air flow duct having an end portion fitted inside a nozzle whose front surface is trued so that it can be applied against the surface to be scanned and so that it can cooperate therewith to form a leak through which air flows as a function of the surface state of the part, and further comprising measuring means for measuring the flow rate of air passing through the leak, wherein the nozzle delimits an annular air flow duct at its trued front surface, the portion of the nozzle inside the air flow duct including a duct connected to the atmosphere and the annular duct including a portion which is of decreasing cross-sectional area in the air flow direction, and which is extended by an end portion of constant cross-sectional area.

* * * * *